United States Patent
Hattori

(10) Patent No.: US 10,506,116 B2
(45) Date of Patent: Dec. 10, 2019

(54) IMAGE PROCESSING APPARATUS CAUSING DISPLAY TO DISPLAY IMAGES, METHOD, AND NON-TRANSITORY COMPUTER-READABLE RECORDING MEDIUM STORING COMPUTER-READABLE INSTRUCTIONS

(71) Applicant: BROTHER KOGYO KABUSHIKI KAISHA, Nagoya-shi, Aichi (JP)

(72) Inventor: Yuka Hattori, Mizuho (JP)

(73) Assignee: BROTHER KOGYO KABUSHIKI KAISHA, Nagoya-shi, Aichi (JP)

( * ) Notice: Subject to any disclaimer, the term of this patent is extended or adjusted under 35 U.S.C. 154(b) by 0 days.

(21) Appl. No.: 15/911,342

(22) Filed: Mar. 5, 2018

(65) Prior Publication Data

US 2018/0288250 A1 Oct. 4, 2018

(30) Foreign Application Priority Data

Mar. 28, 2017 (JP) ................................. 2017-063787

(51) Int. Cl.
*H04N 1/00* (2006.01)
*G06F 3/0488* (2013.01)
(Continued)

(52) U.S. Cl.
CPC ..... *H04N 1/00474* (2013.01); *H04N 1/00411* (2013.01); *H04N 1/00482* (2013.01);
(Continued)

(58) Field of Classification Search
CPC combination set(s) only.
See application file for complete search history.

(56) References Cited

U.S. PATENT DOCUMENTS

| 2010/0039378 A1* | 2/2010 | Yabe | G06F 3/017 |
| | | | 345/156 |
| 2012/0050779 A1* | 3/2012 | Tani | H04N 1/00411 |
| | | | 358/1.13 |

(Continued)

FOREIGN PATENT DOCUMENTS

JP 2009-099067 A 5/2009

*Primary Examiner* — Helen Zong
(74) *Attorney, Agent, or Firm* — Scully, Scott, Murphy & Presser P.C.

(57) ABSTRACT

An image processing apparatus may comprise a display; a coordinate detection portion; a controller; and a main memory storing computer-readable instructions therein. The computer-readable instructions may cause the image processing apparatus to perform causing the display to display a plurality of icon images. The computer-readable instructions may cause the image processing apparatus to perform accepting a first user operation. The computer-readable instructions may cause the image processing apparatus to perform accepting a second user operation executed. The computer-readable instructions may cause the image processing apparatus to perform executing a specific process corresponding to the image processing function assigned to the selected icon image in a case where the first user operation is accepted. The computer-readable instructions may cause the image processing apparatus to perform causing the display to display a first parameter setting image for setting a first parameter in a case where the second user operation is accepted.

14 Claims, 8 Drawing Sheets

(51) Int. Cl.
*G06F 3/0481* (2013.01)
*G06F 3/0482* (2013.01)
*G06F 3/0485* (2013.01)

(52) U.S. Cl.
CPC .......... *G06F 3/0482* (2013.01); *G06F 3/0485* (2013.01); *G06F 3/04817* (2013.01); *G06F 3/04886* (2013.01); *H04N 2201/0094* (2013.01)

(56) References Cited

U.S. PATENT DOCUMENTS

| | | | | |
|---|---|---|---|---|
| 2013/0163023 | A1* | 6/2013 | Tomono | H04N 1/00392 358/1.13 |
| 2013/0267793 | A1* | 10/2013 | Meador | A61B 5/0205 600/301 |
| 2017/0075539 | A1* | 3/2017 | Borromeo | G06F 3/04812 |

* cited by examiner

… (1) …

IMAGE PROCESSING APPARATUS CAUSING DISPLAY TO DISPLAY IMAGES, METHOD, AND NON-TRANSITORY COMPUTER-READABLE RECORDING MEDIUM STORING COMPUTER-READABLE INSTRUCTIONS

TECHNICAL FIELD

The technique disclosed herein relates to an image processing apparatus configured to display an icon image.

BACKGROUND ART

A portable electronic apparatus provided with a display panel is known. Touch sensors are provided on both sides of the display panel. A user may touch a touch sensor portion adjacent to a "change size" button in a state where buttons such as the "change size" button are displayed on the display panel. By so doing, a slider indicator for setting a zoom level of an image displayed on the display panel is displayed on the display panel.

SUMMARY

In a general apparatus, a space for arranging hardware such as a display panel, a touch sensor, and the like is limited, and it is preferable to make effective use of the space. In the above technique, restrictions on a size and arranging position regarding an arrangement of a display panel may possibly be caused by its need to secure spaces for arranging the touch sensors. The description herein discloses a technique that makes effective use of a space occupied by a display in an image processing apparatus.

One technique disclosed in the present application is an image processing apparatus. The image processing apparatus disclosed herein may comprise a display; a coordinate detection portion configured to detect an indicated coordinate which is a coordinate indicating a position where a pointer contacts or comes close to a display area of the display; a controller; and a main memory storing computer-readable instructions therein. The computer-readable instructions, when executed by the controller, may cause the image processing apparatus to perform causing the display to display a plurality of icon images indicating image processing functions of the image processing apparatus. The computer-readable instructions may cause the image processing apparatus to perform accepting, via the coordinate detection portion, a first user operation executed within a display area of a selected icon image which is one of the plurality of icon images. The computer-readable instructions may cause the image processing apparatus to perform accepting, via the coordinate detection portion, a second user operation executed within a display area of the selected icon image. The second user operation may be an operation different from the first user operation. The computer-readable instructions may cause the image processing apparatus to perform executing a specific process corresponding to the image processing function assigned to the selected icon image in a case where the first user operation is accepted. The computer-readable instructions may cause the image processing apparatus to perform causing the display to display a first parameter setting image for setting a first parameter related to a function of the image processing apparatus in a case where the second user operation is accepted.

EMBODIMENTS

Embodiment

Figure 1:
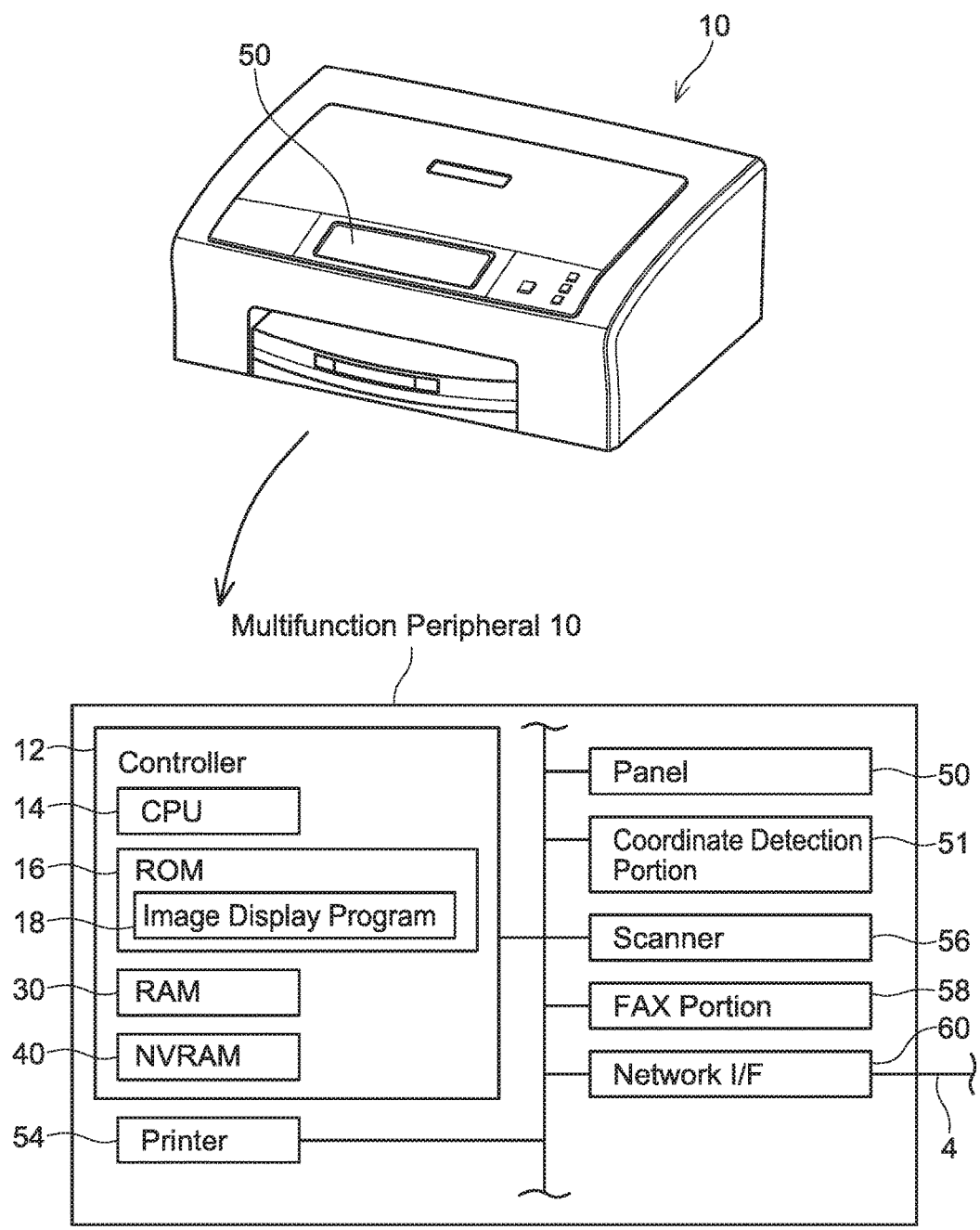
FIG. 1 is a block diagram showing a schematic configuration of a multifunction peripheral of an embodiment of the present disclosure.

FIG. 1 shows a block diagram of a Multifunction Peripheral (MFP) 10 of an embodiment.

<Configuration of Multifunction Peripheral 10>

The multifunction peripheral 10 of the present embodiment is a device provided with a printer function, a scanner function, a copy function, a facsimile function, a telephone function, and the like. The multifunction peripheral 10 includes a controller 12, a panel 50, a coordinate detection portion 51, printer 54, scanner 56, a FAX portion 58, a network interface 60, and the like. The controller 12 includes a CPU 14, a ROM 16, a RAM 30, an NVRAM (Non-Volatile RAM) 40, and the like.

The CPU 14 executes various processes according to programs stored in the ROM 16. The processes executed by the CPU 14 will be described later in detail. The ROM 16 stores an image display program 18 for controlling basic operation of the multifunction peripheral 10.

As shown in FIG. 1, the panel 50 is arranged on a top surface of the multifunction peripheral 10 on a front side. The panel 50 is configured to display various images using an API (Application Program Interface) of the image display program 18. A left and right direction (horizontal direction) relative to a front view position of the panel 50 is an x axis direction. A front and rear direction (vertical direction) relative to the front view position of the panel 50 is a y axis direction. A surface of the panel 50 is provided with a coordinate detection portion 51 having a transparent flat plate so as to cover the panel 50. The coordinate detection portion 51 has a function to detect an indicated coordinate, which is a coordinate indicating a point where a pointer (such as user's fingertip, stylus (pen dedicated to touch panels), and the like) had contacted or came close to. The panel 50 and the coordinate detection portion 51 function as a so-called touch panel.

The RAM 30 is a volatile memory, and is a storage area for storing various types of data generated in the course of executing processes according to the image display program 18. The NVRAM 40 is a nonvolatile memory.

The printer 54 is a portion for executing printing. The scanner 56 is a portion for scanning a document and generating data thereof. The FAX portion 58 is a portion for sending and receiving document data. The network interface 60 is a portion connected to a wired LAN network 4, and is for sending and receiving various types of data.

<Processes Related to Functions of Multifunction Peripheral 10>

Figure 2:
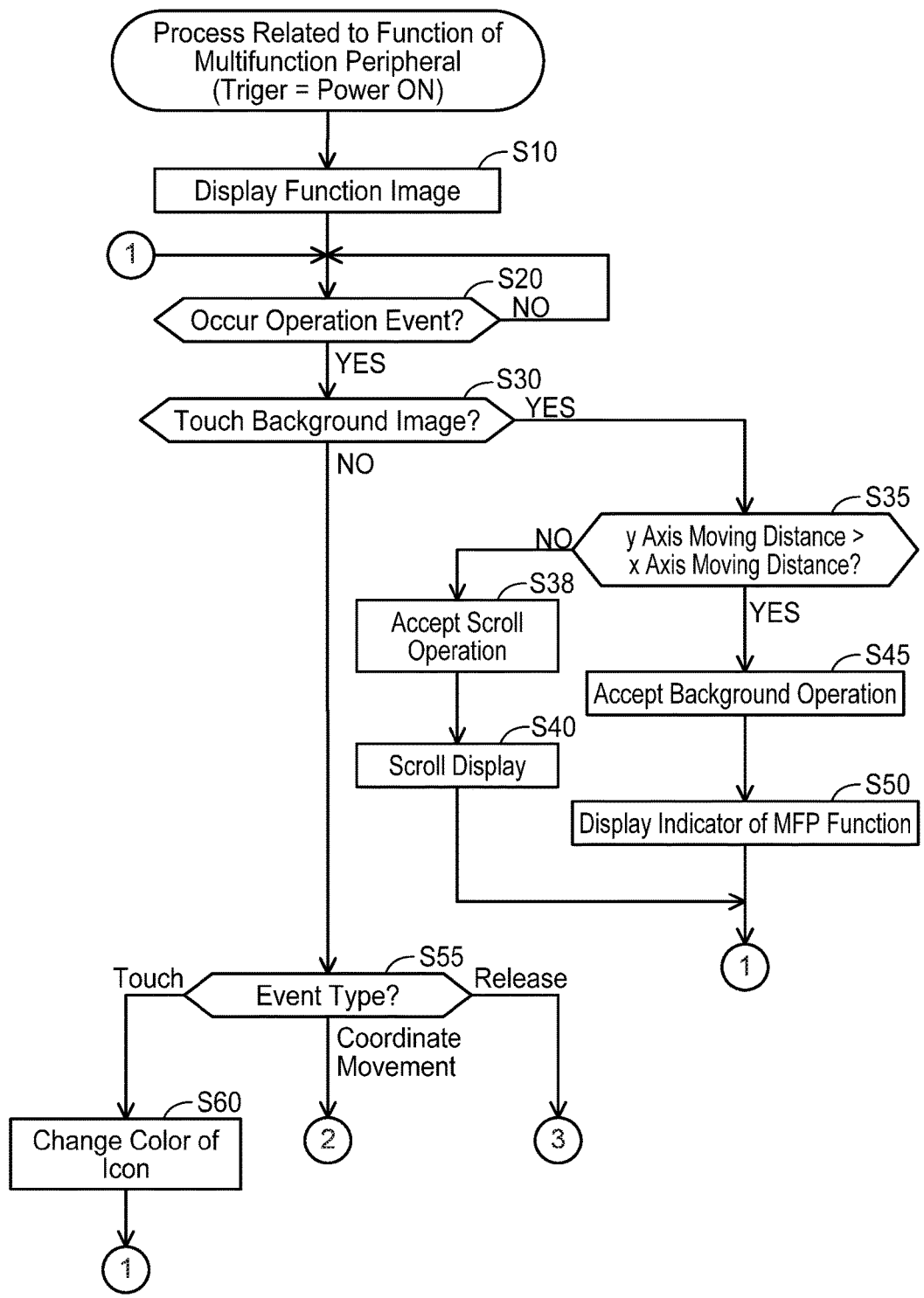
FIG. 2 is a flow chart of a process related to functions of the multifunction peripheral.
Figure 3:
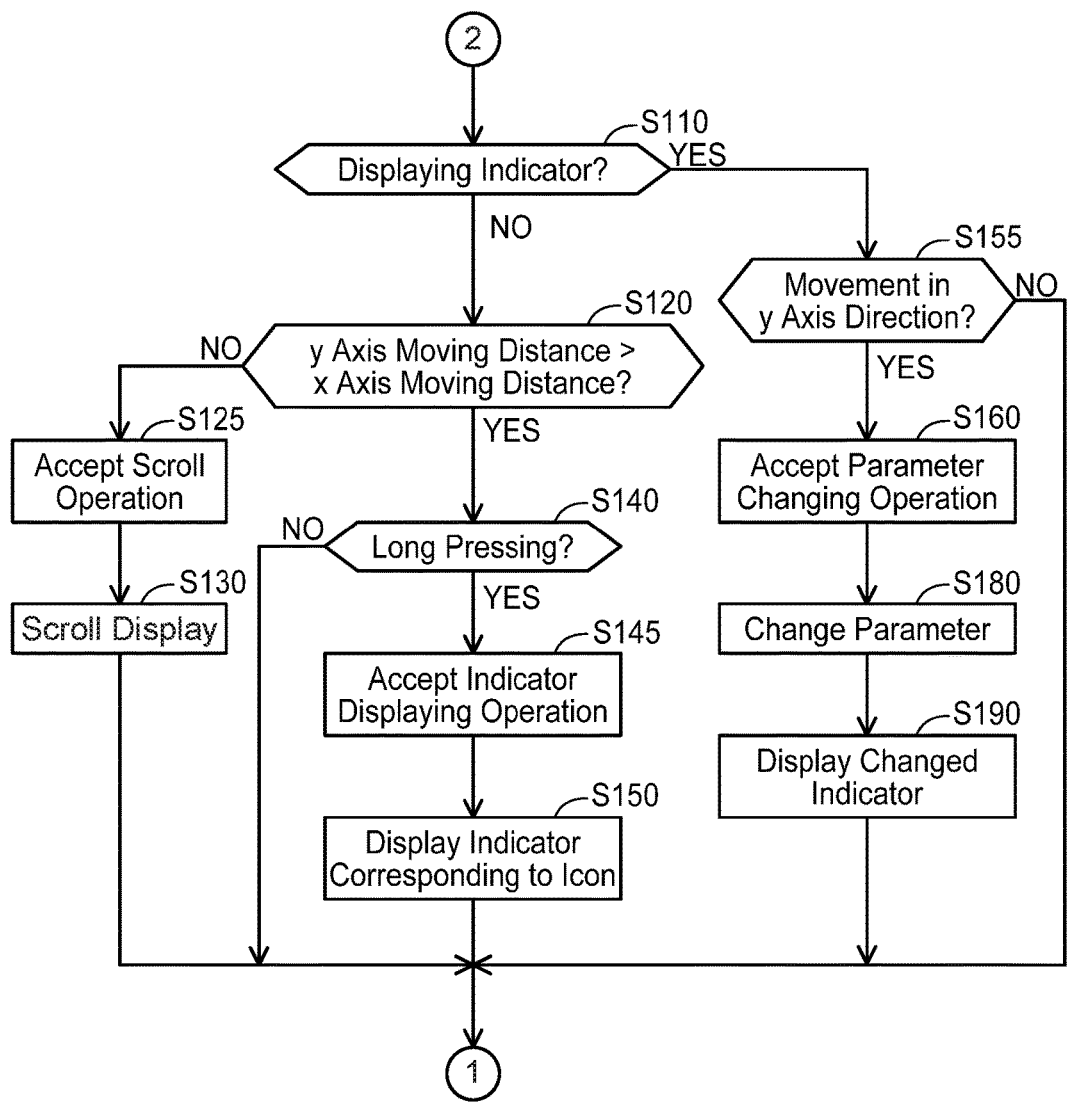
FIG. 3 is a flow chart continued from FIG. 2.
Figure 4:
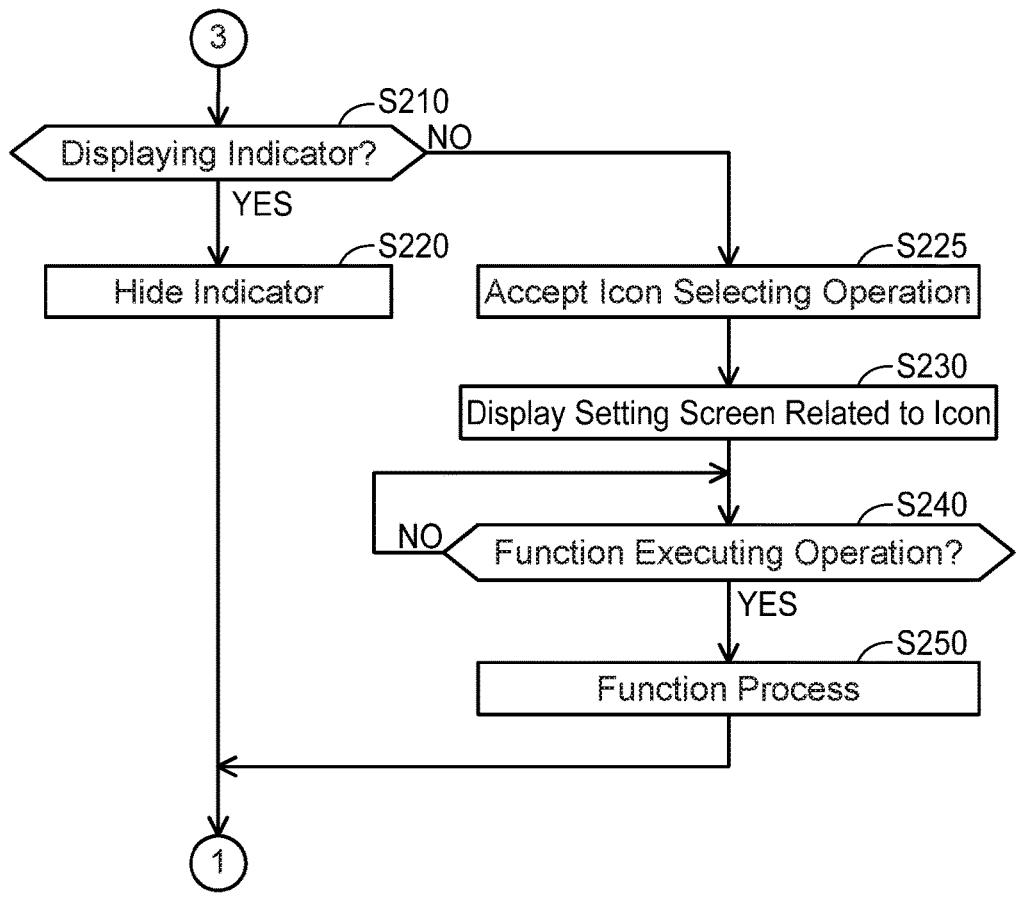
FIG. 4 is a flow chart continued from FIG. 2.

Processes related to functions executed by the multifunction peripheral 10 according to the image display program 18 will be described with reference to flow charts of FIGS. 2 to 4. Process flows shown in FIGS. 2 to 4 are started when a power of the multifunction peripheral 10 is turned on, and are executed until when the power is turned off.

Figure 6:
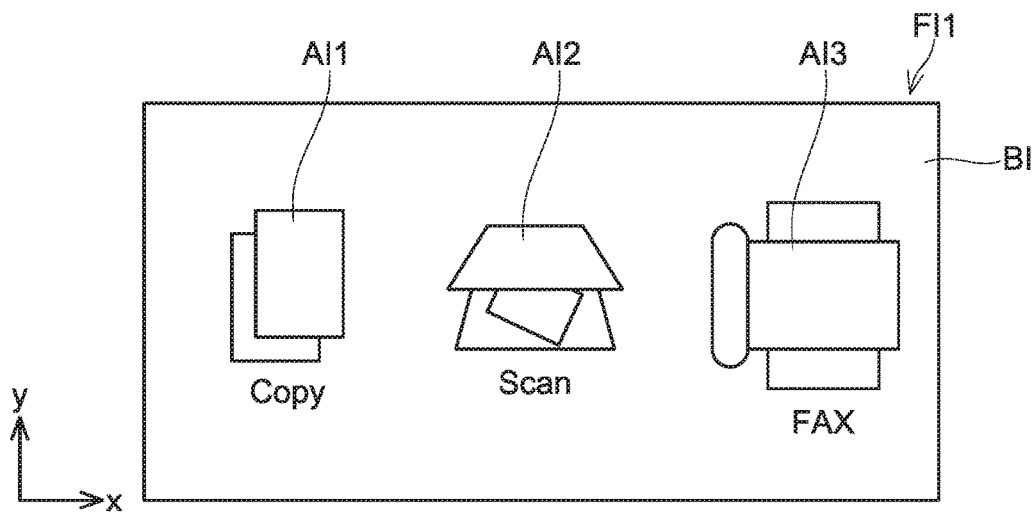
FIG. 6 is a diagram showing an example of a function screen.

In S10, the CPU 14 displays a function image FI1 (see FIG. 6) including a plurality of icon images on the panel 50. The function image FI1 includes a copy icon image AI1 indicating the copy function, a scan icon image AI2 indicating the scan function, and a FAX icon image AI3 indicating the FAX function. The icon images AI1 to AI3 are arranged next to each other along the x axis direction.

In S20, the CPU 14 determines whether or not an operation event has occurred. The operation event is one of events in which the pointer contacts or comes close to the coordinate detection portion 51, the pointer separates away from the coordinate detection portion 51, and an indicated coordinate detected by the coordinate detection portion 51 is moving. Hereinbelow, each of the respective operation events as above may be termed "touch", "release", and "coordinate movement". The CPU 14 proceeds to S30 when an affirmative determination is made in S20.

In S30, the CPU 14 determines whether or not a background image BI (see FIG. 6) has been touched. The background image BI is an image within the panel 50 that is not the icon images. Specifically, the CPU 14 makes an affirmative determination in S30 when the operation event is the touch, and the indicated coordinate detected by the coordinate detection portion 51 indicates a position within the background image BI, and proceeds to S35. On the other hand, the CPU 14 makes a negative determination in S30 when the background image BI is not touched, and proceeds to S55.

In S35, the CPU 14 determines whether or not a moving distance of the indicated coordinate detected in the display area of the background image BI in the y axis direction is greater than its moving distance in the x axis direction orthogonal to the y axis direction. When an affirmative determination is made in S35, the CPU 14 proceeds to S45, and proceeds to S38 when a negative determination is made in S35. In S38, the CPU 14 accepts a scroll operation.

Figure 9:
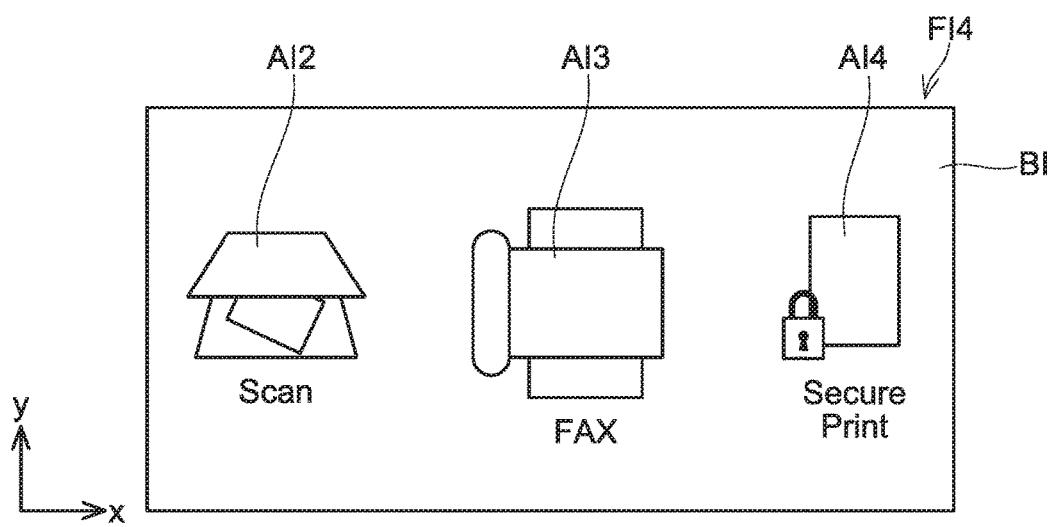
FIG. 9 is a diagram showing a case where a scroll operation is executed.

In S40, the CPU 14 scroll displays the function images in the x axis direction, and displays the function images after the scroll processing on the panel 50. FIG. 9 shows a function image FI4, which is displayed after the function image FI1 of FIG. 6 has been scrolled rightward in the screen. The function image FI4 includes the scan icon image AI2, the FAX icon image AI3, and a secure print icon image AI4 indicating a secure print function, and does not include the copy icon image AI1. The secure print function is a function for executing printing after a PIN code has been inputted to the multifunction peripheral 10.

In S45, the CPU 14 accepts the background operation touching the background image BI through the coordinate detection portion 51.

Figure 7:
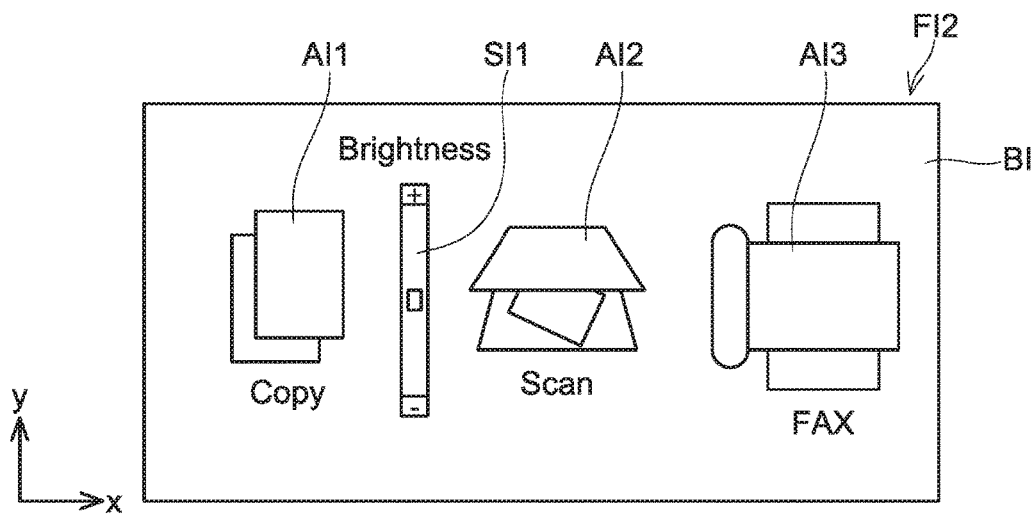
FIG. 7 is a diagram showing a case where a slider indicator for setting brightness is displayed.

In S50, the CPU 14 displays a slider indicator for setting an MFP parameter related to MFP settings of the multifunction peripheral 10 on the panel 50. The slider indicator is an image for changing the parameter according to a moving distance of the indicated coordinate in the y axis direction detected by the coordinate detection portion 51. An example of the slider indicator to be displayed in S50 is shown in FIG. 7. In FIG. 7, a slider indicator SI1 for setting brightness of a displayed image is displayed in the background image BI of the function image FI2. Aside from the setting of the brightness of the displayed image, the setting of the MFP parameter may be setting of time (Sleep Time) since when the operation has not been detected until it is shifted to a sleep state, setting of time (Dim Timer) since when the operation detection has ceased until when the brightness of the displayed image is to be reduced, setting for sheet sizes in tray, or network settings. When S50 is completed, the CPU 14 returns to S20.

In S55, the CPU 14 determines an event type of the operation event. The CPU 14 proceeds to S60 when the operation event is the touch, proceeds to S110 of FIG. 3 when the operation event is the coordinate movement, and proceeds to S210 of FIG. 4 when the operation event is the release.

Figure 8:
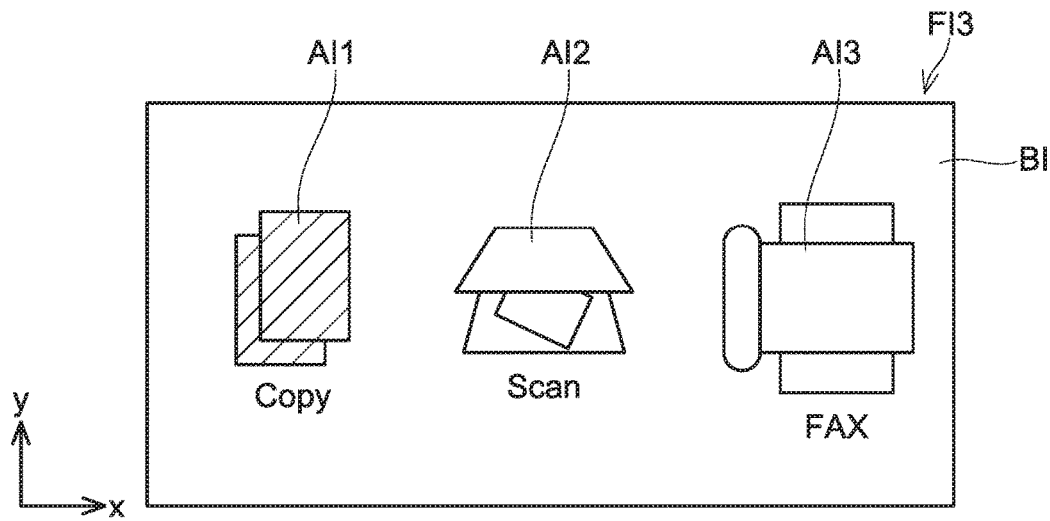
FIG. 8 is a diagram showing a case where a copy icon image is touched.

In S60, the CPU 14 changes a color of the touched icon image (that is, corresponding to the detected indicated coordinate). In FIG. 8, an example in which the color of the copy icon image AI1 in the function image FI3 is changed is shown. When S60 is completed, the CPU 14 returns to S20.

In S110 of FIG. 3, the CPU 14 determines whether or not a slider indicator is displayed in the panel 50. The CPU 14 proceeds to S155 when an affirmative determination is made in S110, and proceeds to S120 when a negative determination is made in S110.

In S120, the CPU 14 determines whether or not the moving distance in the y axis direction of the indicated coordinate detected in the display area of the icon image is greater than its moving distance in the x axis direction orthogonal to the y axis direction. The CPU 14 proceeds to S140 when an affirmative determination is made in S120, and proceeds to S125 when a negative determination is made in S120. S125 and S130 are the same as S38 and S40 of FIG. 2.

In S140, the CPU 14 determines whether or not the icon image is being long-pressed. Specifically, the CPU 14 makes an affirmative determination in S140 when the indicated coordinate is detected over a specified period or longer at a same point in the display area of the icon image, and proceeds to S145. On the other hand, the CPU 14 makes a negative determination in S140 when the indicated coordinate is not detected over the specified period or longer at the same point in the display area of the icon image, and returns to S20.

In S145, the CPU 14 accepts an indicator displaying operation. The indicator displaying operation is an operation that long-presses the icon image, after which it is dragged in the y axis direction.

In S150, the CPU 14 displays a slider indicator related to the function indicated by the icon image that is being operated, by overlapping the slider indicator on the icon image. Specifically, the CPU 14 reads out a parameter registered in the NVRAM 40 in association to the function indicated by the icon image (see S320 of FIG. 5), and displays the slider indicator for setting this parameter on the panel 50.

Figure 10:
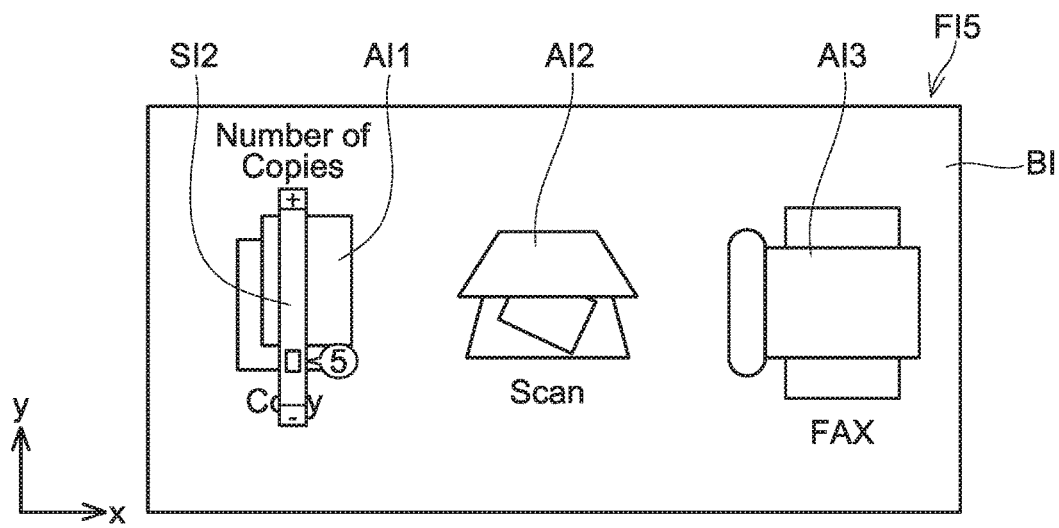
FIG. 10 is a diagram showing a case where a slider indicator corresponding to a copy function is displayed.

FIG. 10 shows an example in which a slider indicator SI2 for setting a number of copies is displayed within a function image FI5. The number of copies is a copy parameter associated with the copy function indicated by the copy icon image AI1, which is being operated. In FIG. 10, a parameter of "5" copies is being set. Aside from the number of copies, the copy parameter may be a zoom level, or a number of pages to be printed per sheet of a print medium.

Figure 11:
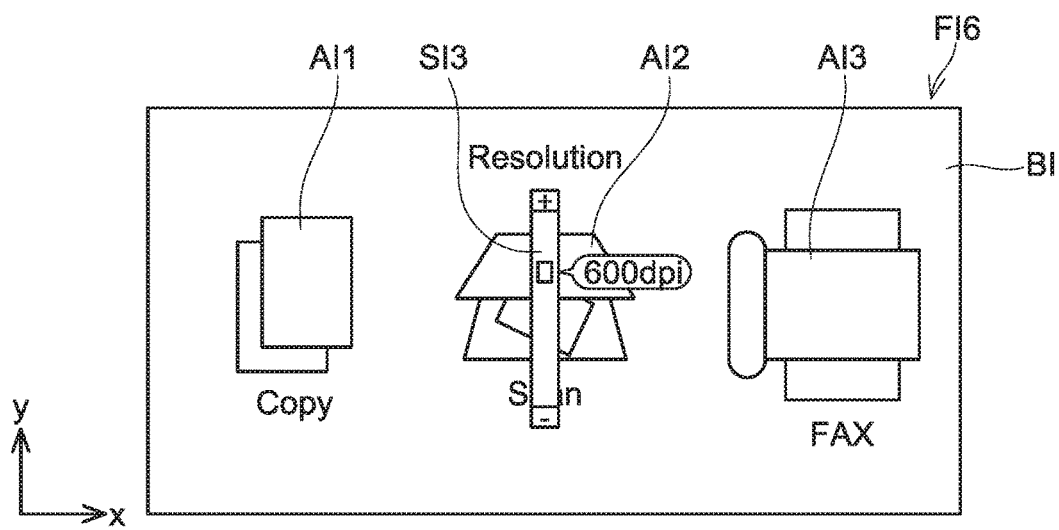
FIG. 11 is a diagram showing a case where a slider indicator corresponding to a scan function is displayed.

FIG. 11 shows an example in which a slider indicator SI3 for setting a scan resolution is displayed within a function image FI6. The scan resolution is a scan parameter associated with the scan function indicated by the scan icon image AI2, which is being operated. In FIG. 11, a parameter of "600" dpi is being set. Aside from the scan resolution, the scan parameter may be contrast, scan data size, and the like.

In S155, the CPU 14 determines whether or not a movement of the indicated coordinate in the y axis direction is detected. The CPU 14 proceeds to S160 when an affirmative determination is made in S155, and returns to S20 when a negative determination is made in S155.

In S160, the CPU 14 accepts a parameter changing operation through the coordinate detection portion 51.

In S180, the CPU 14 changes the parameter according to the moving distance of the indicated coordinate in the y axis direction. The moving distance of the indicated coordinate in the y axis direction and a changing amount of the parameter are proportional.

Figure 12:
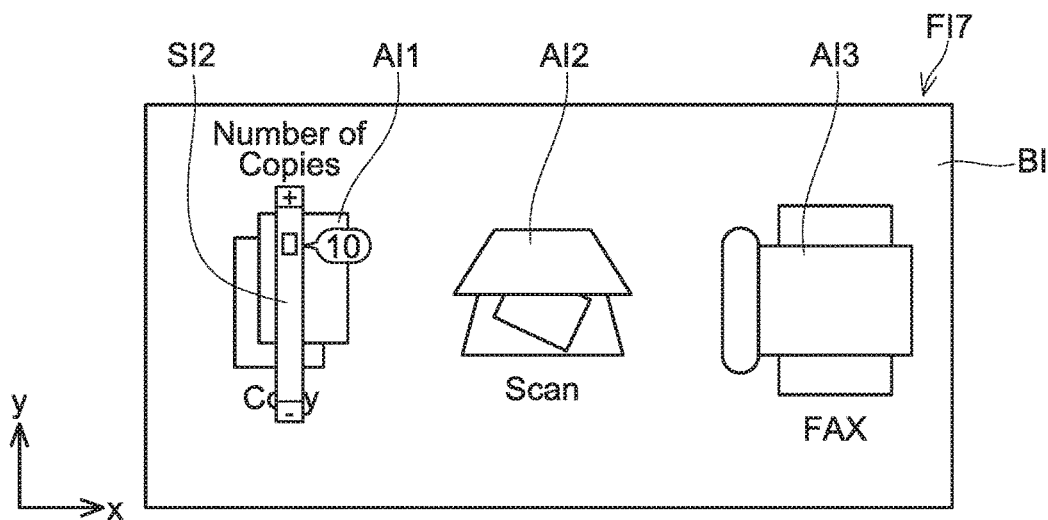
FIG. 12 is a diagram showing a case where a number of copies is changed.

In S190, the CPU 14 displays the slider indicator after the parameter has been changed on the panel 50. For example, the parameter "5" in FIG. 10 is changed to "10" in a function image FI7 of FIG. 12.

S210 of FIG. 4 is the same as S110 of FIG. 3. The CPU 14 proceeds to S220 when an affirmative determination is made in S210, and proceeds to S225 when a negative determination is made in S210. In S220, the CPU 14 hides the slider indicator from the panel 50.

In S225, the CPU 14 accepts an icon selecting operation through the coordinate detection portion 51. The icon selecting operation is an operation to touch a display area of an icon image, which is one of the plurality of icon images in the function image.

Figure 13:
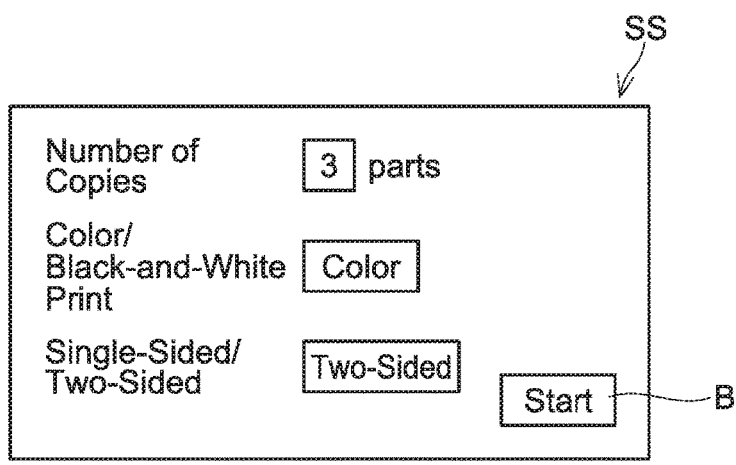
FIG. 13 is a diagram showing a case where an icon selecting operation is executed.

In S230, the CPU 14 displays a setting screen corresponding to a function assigned to the icon image selected in the icon selecting operation on the panel 50. The setting screen is a screen for setting a plurality of parameters corresponding to the function. FIG. 13 shows a setting screen SS related to the copy function in the case where the copy icon image AI1 is selected. The setting screen SS includes setting items such as the number of copies, color/black-and-white printing, single sided/double sided printing, etc., and parameters for the respective setting items. A user can perform a predetermined operation to change these parameters.

In S240, the CPU 14 determines whether or not a function executing operation for executing a process corresponding to the function has been accepted through the coordinate detection portion 51. In the example of FIG. 13, the function executing operation is an operation of pressing a start button B. The CPU 14 proceeds to S250 when an affirmative determination is made in S240.

In S250, the CPU 14 executes a function process. The function process may be, for example, a copy process for the case where the copy icon image AI1 is selected in S225, a scan process for the case where the scan icon image AI2 is selected therein, a FAX process for the case where the FAX icon image AI3 is selected therein, and a print process when the secure print icon image AI4 is selected therein. When S250 is completed, the CPU 14 returns to S20 of FIG. 2.

<Registering Process of Multifunction Peripheral 10>

Figure 5:
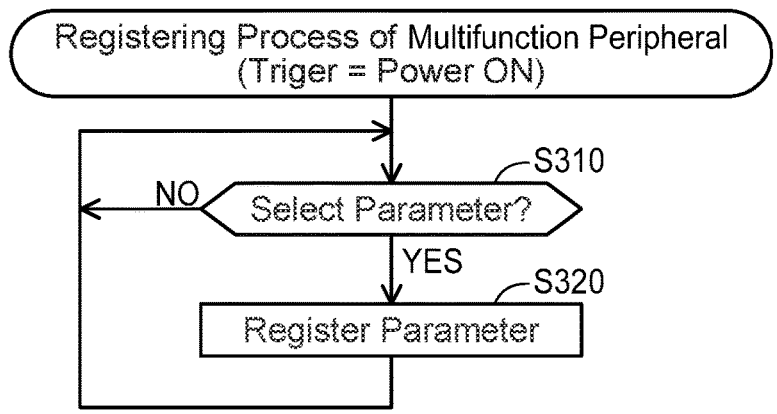
FIG. 5 is a flow chart of a registering process of the multifunction peripheral.

A registering process that the multifunction peripheral 10 executes according to the image display program 18 will be described with reference to a flow chart of FIG. 5. The process flow of FIG. 5 is started when the power of the multifunction peripheral 10 is turned on, and is executed until when the power is turned off.

In S310, the CPU 14 determines whether or not a selecting operation for selecting one parameter from among the plural types of parameters that can be set in the multifunction peripheral 10 has been accepted. The CPU 14 proceeds to S320 when an affirmative determination is made in S310.

In S320, the CPU 14 registers the selected parameter in the NVRAM 40 as a parameter to be displayed in S150 of FIG. 3. Specifically, the CPU 14 specifies a function corresponding to the selected parameter. For example, if the parameter is the number of copies, the copy function is specified. If the parameter is the scan resolution, the scan function is specified. Then, the CPU 14 registers this parameter in the NVRAM 40 in association with the specified function. When S320 is completed, the CPU 14 returns to S310. S310 and S320 are executed repeatedly so that a plurality of parameters can be registered in the NVRAM 40.

<Effects>

In a general example, a display area of each icon image may accept an icon selecting operation (S225 of FIG. 4) of tapping (touch and release) on the icon image, however, it cannot accept an indicator displaying operation (S145 of FIG. 3). Due to this, the multifunction peripheral executes only one type of processing corresponding to the icon selecting operation for one icon image. On the other hand, in the present embodiment, the display area of each icon image can accept both the icon selecting operation and the indicator displaying operation. When the icon selecting operation is accepted (S225 of FIG. 4), the multifunction peripheral 10 executes the process corresponding to the image processing function assigned to the icon image (S230, S250). On the other hand, when the indicator displaying operation is accepted (S145 of FIG. 3), the multifunction peripheral 10 displays the slider indicator (S150). That is, two types of processes are corresponding to one icon image. As above, in the present embodiment, each icon image can be used effectively as compared to the general example as above, in which only one type of process corresponds to one icon image. That is, the multifunction peripheral 10 can make efficient use of the space occupied by the panel 50.

The indicator displaying operation can be inputted by the operation of long-pressing the icon image (YES to S140 of FIG. 3). The long-press operation is an operation that the user would less likely perform without actually intending to do so as compared to the tap operation. Due to this, the indicator displaying operation that was not intended by the user (operation by mistake) can be suppressed from taking place.

The plurality of icon images is aligned in the x axis direction. The user can scroll the function images in the x axis direction by performing the scroll operation (NO in S120) of dragging the images in the x axis direction (S125, S130 of FIG. 3). On the other hand, the user can display the slider indicator (S150) by performing the indicator displaying operation of dragging an image in the y axis direction (YES to S120). That is, in the scroll operation and the indicator displaying operation, the directions along which the dragging is to be performed are orthogonal to each other.

Due to this, an erroneous input of the indicator displaying operation when the user is intending to input the scroll operation and an erroneous input of the scroll operation when the user is intending to input the indicator displaying operation can both be suppressed.

During when the slider indicator is being displayed (YES in S110 of FIG. 3), only a movement in the y axis direction is detected (YES to S155), and a movement in the x axis direction is ignored (NO in S155). As a result of this, an input of the scroll operation, which is an operation in the x axis direction, can be ignored. That is, during when the slider indicator is being displayed, the multifunction peripheral 10 can lock scrolling of the function images. Thus, the function images can be suppressed from being scrolled during when the user is changing a parameter using the slider indicator.

The multifunction peripheral 10 displays the slider indicator related to the function indicated by the icon image for which the indicator displaying operation was performed (S150 of FIG. 3). For example, when the indicator displaying operation is performed on the copy icon image AI1, the multifunction peripheral 10 displays the slider indicator related to the copy settings. When the indicator displaying operation is performed on the scan icon image AI2, the multifunction peripheral 10 displays the slider indicator related to the scan settings. Due to this, the user can easily acknowledge which slider indicator will be displayed when the indicator displaying operation is performed on respective icon images.

When the background operation of touching the background is accepted (S45 of FIG. 2), the multifunction peripheral 10 displays the MFP parameters related to the MFP settings of the multifunction peripheral 10 (S50). Normally, in order to display a changing screen for the MFP parameters, an input operation needs to be performed after having moved to a subordinate level from a level of the screen where the function image (FI1 of FIG. 6, etc.; meaning the screen at the topmost level) is displayed. On the other hand, in this embodiment, a state in which the MFP parameters can be changed becomes ready when the user simply touches the background (that is, in one step). Thus, the multifunction peripheral 10 can reduce operational burden on the user for changing the MFP parameters, and operation time can thereby be shortened.

The user can select a parameter (S310 of FIG. 5), and register it in the multifunction peripheral 10 (S320). That is, the user can freely set the parameter to be changed by using the slider indicator.

Modified Example 1

In the above embodiment, the indicator displaying operation is an operation to long-press an icon image (YES in S140 of FIG. 3), and to drag it in the y axis direction (YES in S120). In this modified example, the indicator displaying operation may be an operation to long-press the icon image. That is, the CPU 14 may execute S140 before S120, and may proceed to S145 if the determination YES is made in S140. In another modified example, the indicator displaying operation may be an operation to drag the icon image in the y axis direction. That is, the CPU 14 may omit S140 after S120, and proceed to S150.

The user may touch an image with a pressure that is equal to or greater than a predetermined threshold (a so-called 3D touch) instead of the long press (S140 of FIG. 3) when the user wishes to perform the indicator displaying operation. That is, in S140, the CPU 14 may determine whether or not the pressure of a touch is equal to or greater than the predetermined threshold.

In S50 of FIG. 2 and S150 of FIG. 3, an input form for entering the parameters may be displayed instead of the slider indicator. The user can enter the parameters by operating buttons provided on the multifunction peripheral 10, for example.

In the above embodiment, the scroll display in S130 of FIG. 3 switches only a part of the function image, as shown in the examples of FIGS. 8 and 9. In the modified example, the function image may be configured of a plurality of pages, and the image may switch in page units by scroll display.

In the above embodiment, an example is given in which the direction along which the icon images are arranged and the direction along which the scroll display of the icon images can be executed are the x axis direction (horizontal direction), however, no limitation is made to this configuration. The icon images may be displayed by being arranged next to each other in the y axis direction (vertical direction), and the list image may be scroll displayed in the x axis direction. Further, in such cases, the slider indicator may be displayed by expanding in the x axis direction (horizontal direction) instead of the y axis direction (vertical direction).

In the present embodiment, a dragging operation in the y axis direction may not only be a dragging operation that completely matches the y axis direction, but may also include a dragging operation in a direction close to the y axis direction. For example, the dragging operation in a direction within a range of ±30 degrees from the y axis direction may be detected as a "dragging operation in the y axis direction". Similarly, a dragging operation in the x axis direction may not only be a dragging operation that completely matches the x axis direction, but may also include a dragging operation in a direction close to the x axis direction.

A scope for which the technique disclosed herein is applicable is not limited to the multifunction peripheral 10, and may include various devices having an image processing function (such as printers and scanners).

The process of accepting the scroll operation (S125 of FIG. 3) may be omitted. The process of scroll displaying the function image (S130 of FIG. 3) may be omitted. The process of accepting the parameter changing operation (S160 of FIG. 3) may be omitted. The process of changing the parameter (S180 of FIG. 3) may be omitted. The process of accepting the background operation (S45 of FIG. 2) may be omitted. The process of accepting the parameter selection (S310 of FIG. 5) can be omitted. The process of registering the parameter (S320 of FIG. 5) can be omitted. An "image processing apparatus" simply needs to be provided with a "display", a "coordinate detection portion", and a "controller" at the least. The "controller" simply needs to be capable of executing: causing the display to display a plurality of icon images indicating image processing functions of the image processing apparatus; accepting, via the coordinate detection portion, a first user operation executed within a display area of a selected icon image which is one of the plurality of icon images; accepting, via the coordinate detection portion, a second user operation executed within a display area of the selected icon image, the second user operation being an operation different from the first user operation; executing a specific process corresponding to the image processing function assigned to the selected icon image in a case where the first user operation is accepted; and causing the display to display a first parameter setting image for setting a first parameter related to a function of the image processing apparatus in a case where the second user operation is accepted, at the least.

The multifunction peripheral 10 is an example of the image processing apparatus. The panel 50 is an example of the display. The icon selecting operation is an example of a first user operation. The indicator displaying operation is an example of a second user operation. The slider indicator is an example of a first parameter setting image. The x axis direction is an example of a first direction. The y axis direction is an example of a second direction. The function image is an example of a screen image. The scroll operation is an example of a third user operation. The background image is an example of an image outside the display area of the selected icon image. The image display program 18 is an example of a computer program.

The CPU 14 executing S10 of FIG. 2 is an example of the controller causing the image processing apparatus to perform causing the display to display a plurality of icon images indicating image processing functions of the image processing apparatus. The CPU 14 executing S225 of FIG. 4 is an example of the controller causing the image processing apparatus to perform accepting, via the coordinate detection portion, a first user operation executed within a display area of a selected icon image which is one of the plurality of icon images. The CPU 14 executing S145 of FIG. 3 is an example of the controller causing the image processing apparatus to perform accepting, via the coordinate detection portion, a second user operation executed within a display area of the selected icon image. The CPU 14 executing S230 and S250 of FIG. 4 is an example of the controller causing the image processing apparatus to perform executing a specific process corresponding to the image processing function assigned to the selected icon image in a case where the first user operation is accepted. The CPU 14 executing S150 of FIG. 3 is an example of the controller causing the image processing apparatus to perform causing the display to display a first parameter setting image for setting a first parameter related to a function of the image processing apparatus in a case where the second user operation is accepted. The CPU 14 executing S125 of FIG. 3 is an example of the controller causing the image processing apparatus to perform accepting a third user operation via the coordinate detection portion in a case where, in a state where the screen image is being displayed, the movement of the indicated coordinate detected in the display area of the display is detected and a moving distance of the indicated coordinate in the first direction is larger than a moving distance of the indicated coordinate in the second direction. The CPU 14 executing S130 of FIG. 3 is an example of the controller causing the image processing apparatus to perform causing the display to scroll display the screen image in the first direction in a case where the third user operation is accepted The CPU 14 executing S160 of FIG. 3 is an example of the controller causing the image processing apparatus to perform accepting a parameter changing operation via the coordinate detection portion in a case where the coordinate detection portion detects movement of the indicated coordinate by a specific distance in the second direction after the first parameter setting image has been displayed. The CPU 14 executing S180 of FIG. 3 is an example of the controller causing the image processing apparatus to perform changing the first parameter corresponding to the specific distance in a case where the parameter changing operation is accepted. The CPU 14 executing S45 of FIG. 2 is an example of the controller causing the image processing apparatus to perform accepting a fourth user operation for touching an image outside the display area of the selected icon image on the display via the coordinate detection portion. The CPU 14 executing S50 of FIG. 2 is an example of the controller causing the image processing apparatus to perform causing the display to display a second parameter setting image in a case where the fourth user operation is accepted, the second parameter setting image being for setting a second parameter that is related to the image processing apparatus. The CPU 14 executing S310 of FIG. 5 is an example of the controller causing the image processing apparatus to perform accepting selection of a specific number of parameters among a plurality of types of parameters that can be set in the image processing apparatus. The CPU 14 executing S320 of FIG. 5 is an example of the controller causing the image processing apparatus to perform registering the accepted specific number of parameters as a specific number of the first parameter corresponding to a specific number of icon images among a plurality of icon images.

What is claimed is:

1. An image processing apparatus comprising:
   a display;
   a coordinate detection portion configured to detect an indicated coordinate which is a coordinate indicating a position where a pointer contacts or comes close to a display area of the display;
   a controller; and
   a main memory storing computer-readable instructions therein, the computer-readable instructions, when executed by the controller, causing the image processing apparatus to perform:
   causing the display to display a plurality of icon images indicating image processing functions of the image processing apparatus;
   accepting, in a basic state that the plurality of icon images is displayed, via the coordinate detection portion, a first operation by a user executed within a display area of an icon image which is one of the plurality of icon images;
   accepting, in the basic state that each of the plurality of icon images is identical to corresponding one of the plurality of icon images displayed when the first operation is accepted, via the coordinate detection portion, a second operation by a user executed within the display area of the same icon image,
   the second operation being an operation different from the first operation;
   executing a specific process corresponding to the image processing function assigned to the icon image in a case where the first operation executed within the display area of an icon image is accepted; and
   causing the display to display a first parameter setting image for setting a first parameter related to a function of the image processing apparatus in a case where the second operation executed within the display area of the same icon image is accepted,
   the same icon image being identical to the icon image at which the first operation is accepted so that the specific process is executed.

2. The image processing apparatus as in claim 1, wherein the accepting of the first operation by a user is performed in a case where the indicated coordinate is detected at a same point within the display area of the same icon image for a first period of time, and
the accepting of the second operation by a user is performed in a case where the indicated coordinate is detected, at a same point within the display area of the same icon image, for a second period of time that is longer than the first period of time.

3. The image processing apparatus as in claim 1, wherein
the plurality of icon images is displayed next to each other in a first direction on the display, and
the accepting of the second operation by a user is performed in a case where a movement in a second direction of the indicated coordinate detected in the display area of the same icon image is detected, the second direction being orthogonal to the first direction.

4. The image processing apparatus as in claim 3, wherein
the causing the display to display the plurality of icon images includes displaying a screen image including the plurality of icon images,
the computer-readable instructions, when executed by the controller, further cause the image processing apparatus to perform:
accepting a third operation by a user via the coordinate detection portion in a case where, in a state where the screen image is being displayed, the movement of the indicated coordinate detected in the display area of the display is detected and a moving distance of the indicated coordinate in the first direction is larger than a moving distance of the indicated coordinate in the second direction; and
causing the display to scroll display the screen image in the first direction in a case where the third operation by a user is accepted, and
the accepting of the second operation by a user is performed in a case where the movement in the second direction of the indicated coordinate detected in the display area of the display is detected and the moving distance of the indicated coordinate in the second direction is larger than the moving distance of the indicated coordinate in the first direction.

5. The image processing apparatus as in claim 4, wherein
the causing of the display to scroll display the screen image includes:
judging whether the first parameter setting image is displayed; and
causing the display to display the screen image after a scroll process in a case where it is judged that the first parameter setting image is not displayed and the third operation by a user is accepted.

6. The image processing apparatus as in claim 4, wherein
the first parameter setting image is an image for changing the first parameter corresponding to the moving distance in the second direction of the indicated coordinate detected by the coordinate detection portion,
the computer-readable instructions, when executed by the controller, further cause the image processing apparatus to perform:
accepting a parameter changing operation via the coordinate detection portion in a case where the coordinate detection portion detects movement of the indicated coordinate by a specific distance in the second direction after the first parameter setting image has been displayed; and
changing the first parameter corresponding to the specific distance in a case where the parameter changing operation is accepted.

7. The image processing apparatus as in claim 1, wherein
the plurality of icon images includes at least one of a print icon image indicating a print function and a scan icon image indicating a scan function,
the first parameter is parameter related to the print function in a case where the same icon image is the print icon image, and
the first parameter is parameter related to the scan function in a case where the same icon image is the scan icon image.

8. The image processing apparatus as in claim 7, wherein
the computer-readable instructions, when executed by the controller, further cause the image processing apparatus to perform:
accepting a fourth operation by a user for touching an image outside the display area of the same icon image on the display via the coordinate detection portion; and
causing the display to display a second parameter setting image in a case where the fourth operation by a user is accepted, the second parameter setting image being for setting a second parameter that is related to the image processing apparatus.

9. The image processing apparatus as in claim 8, wherein
the second parameter includes at least one of volume and brightness of display screen.

10. The image processing apparatus as in claim 1, wherein
the computer-readable instructions, when executed by the controller, further cause the image processing apparatus to perform:
accepting selection of a specific number of parameters among a plurality of types of parameters that can be set in the image processing apparatus; and
registering the accepted specific number of parameters as a specific number of the first parameter corresponding to a specific number of icon images among a plurality of icon images.

11. The image processing apparatus as in claim 1, wherein
the first parameter setting image is superimposed on the same icon image.

12. The image processing apparatus as in claim 1, wherein
the specific process comprises displaying a setting screen corresponding to the image processing function assigned to the icon image, the setting screen for setting at least one parameter corresponding to the image processing function.

13. A method executed by an image processing apparatus, the image processing apparatus comprising:
a display;
a coordinate detection portion configured to detect an indicated coordinate which is a coordinate indicating a position where a pointer contacts or comes close to a display area of the display; and
a controller,
the method comprising, when the controller executes computer-readable instructions;
causing the display to display a plurality of icon images indicating image processing functions of the image processing apparatus;
accepting, in a basic state that the plurality of icon images is displayed, via the coordinate detection portion a first operation by a user executed within a display area of an icon image which is one of the plurality of icon images;
accepting, in the basic state that each of the plurality of icon images is identical to corresponding one of the plurality of icon images displayed when the first operation is accepted, via the coordinate detection portion a second operation by a user executed within the display area of the same icon image, the second operation being an operation different from the first operation;
executing a specific process corresponding to the image processing function assigned to the icon image in a case where the first operation executed within the display area of an icon image is accepted; and causing the display to display a first parameter setting image for setting a first parameter related to a function of the image processing apparatus in a case where the second operation executed within the display area of the same icon image is accepted, the same icon image being identical to the icon image at which the first operation is accepted so that the specific process is executed.

14. A non-transitory computer-readable recording medium storing computer-readable instructions for an image processing apparatus, the image processing apparatus comprising:

a display;

a coordinate detection portion for detecting an indicated coordinate which is a coordinate indicating a position where a pointer contacts or comes close to a display area of the display; and a controller, wherein the computer-readable instructions, when executed by the controller, cause the image processing apparatus to:

cause the display to display a plurality of icon images indicating image processing functions of the image processing apparatus;

accept, in a basic state that the plurality of icon images is displayed, via the coordinate detection portion a first operation by a user executed within a display area of an icon image which is one of the plurality of icon images;

accept, in the basic state that each of the plurality of icon images is identical to corresponding one of the plurality of icon images displayed when the first operation is accepted, via the coordinate detection portion a second operation by a user executed within the display area of the same icon image, the second operation being an operation different from the first operation;

execute a specific process corresponding to the image processing function assigned to the icon image in a case where the first operation executed within the display area of an icon image is accepted; and cause the display to display a first parameter setting image for setting a first parameter related to a function of the image processing apparatus in a case where the second operation executed within the display area of the same icon image is accepted, the same icon image being identical to the icon image at which the first operation is accepted so that the specific process is executed.

* * * * *

UNITED STATES PATENT AND TRADEMARK OFFICE
CERTIFICATE OF CORRECTION

Page 1 of 1

PATENT NO.        : 10,506,116 B2
APPLICATION NO.   : 15/911342
DATED             : December 10, 2019
INVENTOR(S)       : Yuka Hattori It is certified that error appears in the above-identified patent and that said Letters Patent is hereby corrected as shown below:

In the Claims

Column 10, Claim 2, Line 60 should read:
in a case where the indicated coordinate is detected, at Column 10, Claim 2, Line 62 should read:
image, for a first period of time, and Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*